April 26, 1966    S. L. FUDALEY ETAL    3,248,634
ELECTRONIC RINGING GENERATOR
Filed Aug. 28, 1962
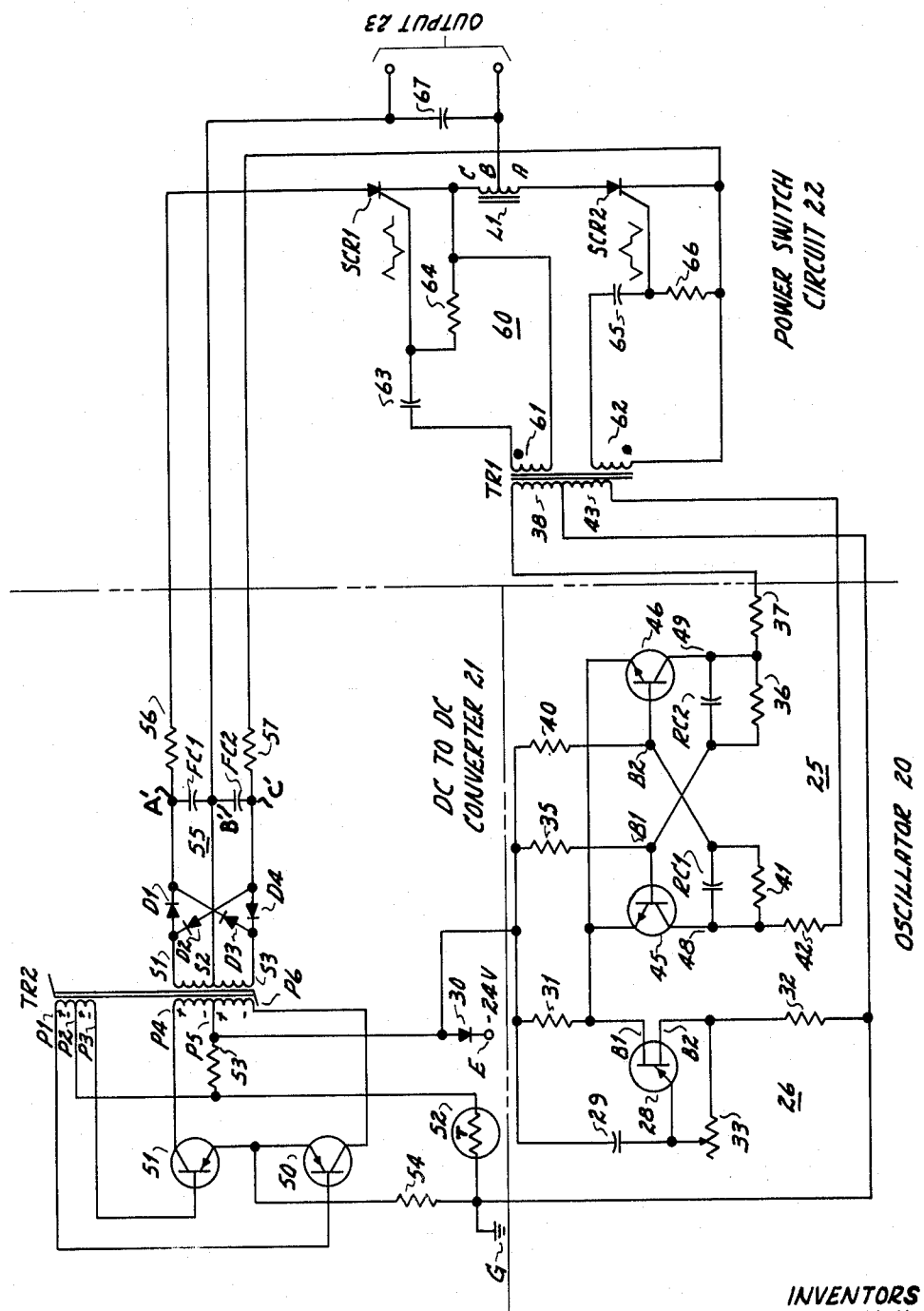
INVENTORS
S. L. FUDALEY
L. MOURLAN JR.
J. E. BUSCH
BY
*Phillip A. Weiss*
ATTORNEY

United States Patent Office 3,248,634
Patented Apr. 26, 1966

3,248,634
ELECTRONIC RINGING GENERATOR
Solly Lawrence Fudaley, Chicago, Louis Mourlan, Jr., Elmhurst, and John E. Busch, Clarendon Hills, Ill., assignors to International Telephone and Telegraph Corporation
Filed Aug. 28, 1962, Ser. No. 219,892
8 Claims. (Cl. 321—2)

This invention relates to ringing generators and more particularly to miniaturized, self-protecting generators which may be over loaded without damage to either the generator or associated circuitry.

Ringing generators supply a voltage wave form which causes a telephone ringer to sound. These generators must meet extremely stringent requirements if they are to have general utility. For example, any variance in the output frequency of the generator voltage wave form may cause an unwanted sounding of non-rung harmonic ringers. Also, ringing generators may be overloaded if lines having an excessive number of ringers are connected thereto.

When ringing generators are used in portable equipment these and other problems become exaggerated. First, the portable equipment may be used in many different environments, such as the arctic, the tropics, a sandy desert, a humid island, or near the boiler room of a ship. Second, the ringing generator must not only operate in these environments but also must meet space and weight requirements. Third, the ringing generator must not put excessive demand on associated equipments such as limited power supplies, and the like. Still other problems will, of course, occur to those skilled in the art.

Although the foregoing statement highlights the general problems encountered during the design of ringing generators, the advantages of this invention may be further clarified by an explanation of the specific problems encountered when one particular ringing generator was used. That generator was included in a manual switchboard mounted in a box to be carried by four men between a truck and a military command post. That particular generator was designed to ring out over lines having a maximum of five ringers. But overload conditions occurred when more than five ringers had to be attached to any rung line and when an operator incorrectly rang over two or more lines simultaneously. The conditions were such that fuses could not be used because the generator would become inoperative after fuses burned out. A result was the use of a circuit which shunted overload currents and thereby placed a heavy current drain on the system battery. Also, the generator required an extremely heavy output transformer which greatly increased the volume of weight of the box carried by the four men. In addition, the generator required very expensive especially constructed components. Moreover, the output frequency was not stable under all environmental conditions.

Accordingly, an object of the invention is to provide new and improved ringing generators. More particularly, an object is to provide generators which remain stable despite wide fluctations of environmental conditions. In fact, an object is to provide a generator having a stable output wave form despite load impedance fluctuations which vary from 1000Ω to 00Ω under ambient temperature changes from —40° C. to +70° C., and the output collapses when the load impedance drops below 1000Ω.

Another object of the invention is to provide an extremely lightweight, miniaturized ringing generator. Here an object is to provide a generator which fits into a cube no greater than 3″ per side. A further object is to accomplish these objects without requiring expensive, specially designed components. Quite the contrary, an object is to use only low cost, readily available, mass produced components.

Yet another object is to provide ringing generators which are not damaged by overload conditions; in fact, an object is to provide unfused generators which are not damaged by a dead short circuit across the output terminals. In addition, an object is to accomplish this overload protection without putting an excessive load on any associated generator power supplies. Quite the contrary, an object is to eliminate virtually all demands on the associated power supply during overload conditions.

In accordance with one aspect of this invention a ringing generator comprises a D.C. to D.C. converter utilizing a saturable reactor driven between opposite states of magnetic saturation. The saturable reactor is driven by either of two alternately conducting transistors. The emitter current in the two transistors varies directly with the output load curent of the ringing generator. As the load current increases, the emitter current increases. Soon after the load current goes up, the voltage drop across an emitter bias resistor drops to a point where both transistors are near cut-off. As soon as the load impendance increases sufficiently the transistors output current increases and the ringing generator resumes normal operation. Thus, overload currents produce no adverse effects.

The above mentioned and other objects of this invention together with the manner of obtaining them will become more apparent and the invention itself will be best understood by making reference to the following description of an embodiment of the invention taken in conjunction with the accompanying single sheet drawing which is a schematic circuit diagram showing a ringing generator constructed in accordance with this invention.

The principal circuit divisions of the ringing generator are an oscillator 20, a D.C. to D.C. converter 21, and a power switch circuit 22. The oscillator 20 sets the output frequency. The converter 21 converts a steady state-24 v. battery potential into a steady state output 100 v. potential. The switch 22 gates the 100 v. power to the output 23 at the frequency set by the oscillator.

The oscillator 20 includes a flip-flop circuit 25 driven by a relaxation oscillator 26. Since flip-flop circuits are well known devices, no effort is here made to describe the construction of flip-flop 25 in detail. Instead, the description will move directly to the construction of the relaxation oscillator 26.

The basic components of the relaxation oscillator 26 are a unijunction transistor 28, a control capacitor 29, and a source of potential E, which may be a —24 volt battery. This battery E connects to the well known B1 base of the unijunction transistor 28 via a diode 30 and a bias resistor 31. Ground G connects to the well known B2 base via a bias resistor 32. The emitter connects to the battery E via capacitor 29 and diode 30, and to the ground G via potentiometer 33 and resistor 32. When no charge is on capacitor 29, the emitter to base B1 potential is less than the potential gradient across the parallel semiconductor material of the unijunction transistor. Thus, the PN junction of the unijunction transistor is reverse biased and only a little reverse bias current flows between the bases B1, B2.

When power is applied, capacitor 29 charges over the circuit extending from battery E through diode 30, capacitor 29, potentiometer 33, and resistor 32 to ground G. When the potential on the capacitor 29 exceeds the gradient of the voltage on the parallel semiconductor material, the PN junction is forewardly biased. Thereupon, the capacitor discharges through the junction, and the cycle repeats. The repeated slow charging fast discharging, produces a spiked wave form across the resistor 31. The potentiometer 33 controls the rate at which the capacitor 29 charges and, therefore, the frequency of oscillation.

The unijunction transistor circuit provides great temperature stability. In greater detail, frequency stability depends upon the peak voltage (Vp) required to fire the unijunction transistor. It can be shown that the peak voltage (Vp) varies as follows:

$$Vp = nVbb + Vd$$

where $n$ = the intrinsic stand-off ratio of the unijunction transistor
$Vbb$ = the base-to-base voltage
$Vd$ = the voltage drop across the emitter diode when the forward current is equal to the peak point current.

The voltage $Vd$ is the factor which varies with temperature, typically at a rate of about 3 mv./° C. This effect is caused by the increased emitter to base B1 conductivity. Compensation for temperature variation may be made by selecting the correct values for the base bias resistors 31, 32. In one exemplary generator there were good results when: $E = -24$ v.; capacitor 29 = 0.33 μf.; resistor 31 = 620Ω; resistor 33 = 0.5MΩ; resistor 32 = 390Ω; and the unijunction transistor 28 was a type 2N492. In any event, the exemplary relaxation oscillator was found to provide an extremely stable frequency despite wide fluctuations of ambient temperature.

The oscillator 20 operates this way. Assume that power is applied, that capacitor 29 is discharged, and that the unijunction transistor 28 is "off." Current from battery E flows through diode 30 and then divides—one arm of the current divider including resistors 35–37 and winding 38 to ground G, and the other arm of the current divider including resistors 40–42 and winding 43 to ground G. The resulting voltage drops forwardly bias transistors 45, 46; however, one transistor begins to conduct first. If current through transistor 45 builds first, the voltage at point 48 goes negative driving transistor 46 toward an "off" condition. As transistor 46 switches "off," point 49 goes positive and transistor 45 is driven into saturation. The transistor 46 switches "off."

The flip-flop is stabilized against change with ambient temperature variation. That is, the values of the resistors 35, 40 are selected so that the bases of the transistors 45, 46 remain more negative than the emitters even if reverse bias current should increase with temperature.

When the capacitor 29 charges to the potential difference between the emitter and base B1 a positive voltage pulse appears across resistor 31. The emitters of both transistors 45, 46 go positive. Transistor 45 begins to conduct less, thus making its collector and the base of transistor 46 more positive. Thereupon the transistor 46 switches "on" and transistor 45 switches "off."

The transistors 45, 46 reverse their conductive states when the next pulse appears across resistor 31. Thus, square wave output pulses appear across the resistors 37, 42, displaced from one another by 180°. These pulses are transferred to the power switch circuit 22 by transformer TR1. The operation of the power switch circuit 22 in responding to these pulses will be described hereinafter.

A detailed description of the D.C. to D.C. converter 21 will now be given. Converter 21 comprises a single saturable reactor, square loop core forming a square wave oscillator with full-wave rectification and filtering of the oscillator output. The converter 21 includes a pair of power transistors 50 and 51, a thermistor 52, and the saturable core reactor TR2 having a primary winding P4–P6, a secondary winding S1–S3, and a feedback winding P1–P3.

Transistors 50 and 51 function as switches and rapidly switch from a cutoff to an on condition to minimize transistor dissipation. The emitters of the transistors 50 and 51 are connected in parallel to ground through a resistor 54; the collectors are connected across the primary winding taps P4–P6; and the bases are connected across feedback winding taps P1–P3. The transistors are controlled by an initial starting bias provided by thermistor 52 and dropping resistor 53 which form a voltage divider connected between battery E and ground G since the battery-connected side of resistor 53 is connected to the transistor collectors through primary windings P4, P6 and the ground connected side of resistor 53 is connected to the transistor bases through feedback windings P1, P3. Thus, the voltage difference between the base and collector electrodes of each transistor causes both of them to conduct. However, it is assumed that an unbalance exists between the electrical characteristics of the transistors 50 and 51 and one transistor initially conducts more heavily than the other. Such an unbalance is necessary in order to start the transistor circuit into oscillation.

Assuming that transistor 51 begins to conduct more heavily than transistor 50, more current will flow through the primary winding P4–P5 than through primary winding P5–P6. The resulting flux establishes the polarities indicated in the drawings.

The polarities of the feedback windings P1 to P3 are such that, at this time, transistor 51 is driven toward saturation and transistor 50 is driven toward cutoff.

As long as transistor 51 conducts the flux in the core of the saturable reactor TR2 increases at a relatively constant rate, thereby producing a relatively constant feedback voltage to the transistors 50 and 51. When the saturable core becomes saturated, additional current through the primary windings fails to increase the core flux and thus the feedback voltage through the feedback windings P1 to P3 drops to zero. At this time, the current driving the base of transistor 51 falls to zero and transistor 51 is driven to cutoff. When transistor 51 is cutoff, the current flow in the collector circuit and through windings P4–P5 ceases and thus the core flux begins to decrease.

Immediately upon the start of a flux decrease in the saturable core, voltages of an opposite polarity are induced in all of the transformer windings. Since the polarities of the feedback windings are reversed, transistor 51 is driven further toward cutoff and transistor 50 is driven toward heavier conduction. As transistor 50 conducts, current flows through the primary windings and the core again becomes saturated in the opposite magnetic direction. At this time, transistor 50 is cutoff and transistor 51 starts heavy conduction. Thereafter, this described cycle of alternate conduction and cutoff of the transistor 50 and 51 continues.

The frequency of oscillation of the oscillator of the converter is given as follows:

$$F = \frac{V}{4NB_{Sat}A}$$

where $V$ = primary voltage
$N$ = number of primary turns
$B_{Sat}$ = saturation flux density
$A$ = cross-sectional area of core.

From the foregoing it can be seen that the frequency of oscillation is arbitrarily chosen. However, in order to maintain the area of the saturable core small, a frequency of approximately 1000 cycles per second is desirable. Thus, the core of transformer TR2 is alternately saturated at a repetition rate of 1000 cycles per second. The number of turns on the secondary windings are chosen so that a 200 volts R.M.S. square wave output is fed to a full-wave rectifier 55 comprising the rectifier diodes D1 to D4.

In keeping with one aspect of this invention, any overload on the ringing generator collapses the operation of the converter for a period of time which lasts as long as the overload condition continues. After the load returns to normal, the converter automatically begins functioning anew. This collapsing operation feature of the converter is accomplished by the use of the emitter resistor 54 connected to the transistors 50 and 51. Resistor 54 acts as an "output power governor" and has a value which causes the converter collapse to occur when approximately 5 watts of power is delivered to the load. This arrangement provides the following two advantages: (1) if the operator rings a faulty line wherein the ringer impedance is below the impedance normally presented by four parallel ringers, the converter collapse prevents excessive load current and excessive power supply current drain, and (2) if the switchboard operator rings a shorted line, the converter collapse prevents excessive current drain in the power supply and precludes the possibility of excessive current damaging the ringing generator.

The converter collapses when current through emitter resistor 54 reaches a predetermined level. In greater detail, the base potential of the "on" transistor is supplied from battery E, through diode 30, resistor 53, and the feedback winding P1–P3, all of which are relatively independent of the load fluctuations. The current through the emitter resistor 54, on the other hand, increases as the load current increases and decreases as the load current decreases. As the current through resistor 54 increases, the IR drop across it increases, thus decreasing the emitter-to-base potential difference. When the load current reaches a high enough value the transistors 50, 51 are driven near cutoff by this loss of emitter-to-base bias resulting from the increased current through resistor 54. The value of the load current which causes the converter to collapse can be selected by selecting the value of resistor 54. If the value of this resistor is increased, the emitter potential moves toward the base potential faster so that the collapse occurs at a smaller value of load current increase. This means that the output power available is reduced by increasing the value of resistor 54. Conversely, the output power available is increased by a decrease in the value of resistor 54.

Resistor 54 also acts to stabilize the converter when it is operating in high ambient temperatures. At a given load impedance, the load current tends to increase as the ambient temperature increases. This, in turn, increases the emitter current and consequently the voltage drop across resistor 54. This increased voltage drop tends to decrease the emitter current. Therefore, an increase in load current due to a temperature increase is compensated for by the decrease in forward bias.

Another stabilizing component employed in the converter circuitry is thermistor 52. It has the dual function of insuring reliable starting at low ambient temperatures and insuring converter stability after collapse at high ambient temperatures.

Under low ambient temperature conditions, the thermistor 52 presents a higher resistance than at room temperature. Thus, at low ambient temperatures, the bases of the transistors are at a more negative potential and consequently have an increased forward bias. This increased forward bias counteracts the inherent increase in the resistivity of emitter region caused by the decreased temperature to insure the start of oscillation of the circuit.

Under high ambient temperature conditions, the thermistor 52 presents a lower resistance than at room temperatures. Thus, at high ambient temperatures the bases of the transistors are at a lower negative potential and consequently have a decreased forward bias. The decreased forward bias counteracts the inherent decrease of emitter region resistivity which occurs with increasing ambient temperature. This insures converter stability after collapse even under high ambient temperature conditions and prevents an overheating due to excessive collector current which could result in thermal runaway of the transistor.

Ideally, the thermistor should present zero resistance at high temperatures resulting in a zero base to emitter bias. To approach this ideal, thermistor 52 has a value which presents a low resistance at high ambient temperatures.

The overall resulting output at the secondary windings of reactor TR2 is a square wave which is delivered to a full wave rectifier such as bridge rectifier 55, a device that is well known to those skilled in the art. The full wave rectifier is comprised of diodes D1–D4, and its output is a D.C. potential applied between terminals A' and C'. The secondary center tap, terminal B', is provided to give a potential which is one-half that of the potential between A' and C'.

The outputs of the D.C.-D.C. converter 21 and the oscillator 20 are coupled to and operate power switch 22 to provide A.C. ringing current.

In greater detail, the converter output is coupled through limiting resistors 56, 57 which establish a maximum available output current. Filter capacitors FC1, FC2 are placed across the converter output to minimize the ripple in the D.C. output.

Means, such as transformer TR1, are provided for coupling the output of oscillator 20 to alternately gate two silicon controlled rectifiers. That is, the secondary of transformer TR1 is comprised of two separate coils 61, 62 which alternately have positive polarity as indicated by the black dots at the top side of each coil. These polarities are, of course, determined by the outputs of the flip-flop circuit 25 of oscillator 20 which are displaced from one another by 180°.

Pulse shaping means, such as differentiator 60, are provided for shaping the pulses fed to the gates of the SCR's and for isolating the flip-flop 25 so that the flip-flop always has a constant load regardless of the load on the output of the ringing generator.

In greater detail, capacitor 63 is connected between the upper side of winding 61 of transformer TR1 and the gate electrode of silicon controlled rectifier SCR1. The other side of winding 61 is connected to the cathode of silicon controlled rectifier SCR1. Resistor 64 is connected from the junction of capacitor 63 and the gate electrode of silicon controlled rectifier SCR1 to the cathode of that rectifier. The capacitor 63 and resistor 64 make up the differentiating circuit that gates silicon controlled rectifier SCR1.

In a similar manner, capacitor 65 and resistor 66 are connected as a differentiating circuit for the rectifier SCR2.

The positive side of the converter 21 output, resistor 56, is coupled to the anode of rectifier SCR1 and the negative side of the converter output, resistor 57, is coupled to the cathode of rectifier SCR2. The cathode of rectifier SCR1 is coupled to the anode of SCR2 through a means (an inductor L1) for controlling the timely switching of the silicon controlled rectifier circuit. The output 23 of the ringing generator is connected to a center tap terminal B on inductor L1 and terminal S2 of saturable reactor TR2. Bridging the output 23 is a commutating means, such as capacitor 67, which in cooperation with inductor L1 controls the instant at which the output voltage reverses.

The power switch circuit 22 operates this way. At the instant when the gate electrode of silicon controlled rectifier SCR1 is driven positive with respect to its cathode responsive to the output of oscillator 20, the gate electrode rectifier SCR2 is driven negative with respect to its cathode. Rectifier SCR1 begins to conduct and supplies current through one-half of the inductor L1, from point C through point B to the load. At the same time, capacitor 67 charges to a potential substantially equal to the positive supply voltage.

Responsive to a reversal of the oscillator 20 output, rectifier SCR2 is gated "on." This places point A of inductor L1 at a potential substantially equal to the negative supply voltage. Since the voltage on the capacitor can not change instantaneously, point B remains at a potential approximately equal to the positive supply voltage. This gives rectifier SCR1 time to recover to the blocking state. The current flowing from points A to B induces a potential through auto transformer actions in the winding from points C to B so that point C goes to a potential of approximately twice the positive supply voltage. Because the cathode of rectifier SCR1 is now positive with respect to its anode, rectifier SCR1 stops conducting. Capacitor 67, therefore discharges through the portion of inductor L1 that extends from points B to A, rectifier SCR2, and through the load. When capacitor 67 is discharged, point B is at a potential substantially equal to the negative supply voltage.

The potential difference between points C and B causes a current flow in the windings between points C and B which in turn induces a current in the windings between A and B that puts point A at a potential of approximately twice the negative supply voltage. This voltage is sufficient to turn off rectifier SCR2 since anode is now negative with respect to its cathode. The cycle repeats itself when rectifier SCR1 is gated on by the oscillator 20 output.

From the above description of operation it can be seen that point B cyclically varies between positive and negative supply voltage in accordance with the frequency of oscillator 20.

Some of the advantages of this circuit are its invulnerability to variation in the output load. That is, excessive load variations will not injure components in the unit nor will they cause any variation in the output frequency. In addition, no heavy output transformer is required, whereby the unit is smaller and lighter and less expensive but more reliable than ringing generators presently available.

While the principles of the invention have been described above in connection with specific apparatus, it is to be clearly understood that this description is made only by way of example and not as a limitation on the scope of the invention.

We claim:

1. An electronic ringing generator for supplying ringing current of a predetermined frequency comprising D.C. to D.C. converter means for stepping up battery supply voltage to D.C. potentials sufficient to energize telephone ringers, said converter comprising transistorized saturable reactor square wave oscillator means, said oscillator comprising a resistive negative feedback circuit, means for automatically collapsing the operation of said oscillator when said converter load reaches a predetermined maximum and for automatically reestablishing the operation of said oscillator when said converter load falls below said predetermined maximum, rectifying means coupled to the output of said oscillator for rectifying said square wave to obtain D.C. signals of said ringing potential, ringing generator output terminals, power switching means, means connected to said converter rectifying means for coupling said signals of ringing potential to said output terminals, said switch means including means for automatically switching said D.C. ringing potential on and off to form an A.C. signal output, control means for causing said switching means to turn on and off at said predetermined frequency, said control means comprising oscillator means for supplying control signals at said predetermined frequency, and differentiating circuit means for shaping said signals, means for applying said shaped signals to said power switch means and isolating said oscillator from said load, thereby insuring the stability of said oscillator circuit.

2. An electronic ringing generator for supplying ringing current of a predetermined frequency comprising battery supply means, D.C. to D.C. converter means for stepping up said battery supply voltage to positive and negative D.C. potentials of sufficient amplitude to energize telephone ringers, negative feedback resistor means in said converter for automatically switching off said converter when its load reaches a certain predetermined amplitude and for automatically switching said converter back on when said load falls below said predetermined amplitude, ringing generator output terminals for connecting said ringing generator to telephone ringers, power switching means comprising a pair of silicon controlled rectifiers each having an anode, a cathode and a gate electrode, means for connecting the anode of a first of said silicon controlled rectifiers to said positive D.C. potential of said converter, means for connecting the cathode of said second silicon controlled rectifier to said negative D.C. potential of said converter, means for connecting the cathode of said first rectifier to the anode of said second rectifier, said last named means comprising a center tapped inductor means for limiting current during switching of said rectifiers, an oscillator having two outputs displaced from each other by 180° at said predetermined frequency, means for connecting the center tap of said inductor to said output terminals for coupling said rectifiers to said output terminals, means responsive to a first of said oscillator outputs for gating said first rectifier to conduct, means responsive to the second oscillator output for gating said second rectifier to conduct and means bridging said output terminals for commutating said output signals thereby providing A.C. output signals at said predetermined frequency.

3. In the ringing generator of claim 2 and means for isolating said oscillator from said output.

4. In the ringing generator of claim 3 wherein said isolating circuit comprises differentiating network means at each oscillator output for supplying a wave form of sufficient amplitude and shape to gate said rectifiers.

5. In the ringing generator of claim 4 wherein said oscillator means comprises saturated flip-flop circuit means for providing two outputs 180° displaced from each other and relaxation oscillator means for driving said flip-flop means at said predetermined frequency.

6. In the ringing generator of claim 5 wherein said converter comprises saturable reactor square wave generator for converting said battery supply into high potential A.C. square wave signals, transistor means for driving said reactor, and rectifier means for converting said square wave signals to higher potential positive and negative D.C. signals.

7. In the ringing generator of claim 6 wherein said feedback resistor means is in the emitter circuit of said transistor means.

8. In the ringing generator of claim 7 and thermistor means for temperature stabilizing said transistor means.

References Cited by the Examiner

UNITED STATES PATENTS

| | | | |
|---|---|---|---|
| 2,861,237 | 11/1958 | Zelina | 321—18 |
| 2,892,952 | 6/1959 | McVey | 307—88.5 |
| 2,916,704 | 12/1959 | Morey | 331—113 |
| 3,004,206 | 10/1961 | Sheffet | 331—113 |
| 3,067,378 | 12/1962 | Paynter | 307—88.5 |
| 3,074,008 | 1/1963 | McPhail | 307—88.5 |
| 3,133,241 | 5/1964 | White | 321—45 |

FOREIGN PATENTS 1,094,314   8/1960   Germany.

OTHER REFERENCES

General Electric-Silicon Controlled Rectifier Manual, second edition, 1961, pages 52–53 and 161–162 relied on.

LLOYD McCOLLUM, *Primary Examiner.*

J. J. KISSANE, J. C. SQUILLARO, *Examiners.*